United States Patent [19]
Danielsson

[11] Patent Number: 5,651,617
[45] Date of Patent: Jul. 29, 1997

[54] CONNECTING RING

[75] Inventor: Ulf Danielsson, Gothenburg, Sweden

[73] Assignee: AB Volvo, Sweden

[21] Appl. No.: 545,593

[22] PCT Filed: May 9, 1994

[86] PCT No.: PCT/SE94/00424

§ 371 Date: Jan. 4, 1996

§ 102(e) Date: Jan. 4, 1996

[87] PCT Pub. No.: WO94/27055

PCT Pub. Date: Nov. 24, 1994

[30]  Foreign Application Priority Data

May 12, 1993 [SE] Sweden ................................ 9301501

[51] Int. Cl.$^6$ ........................................ F16C 33/30
[52] U.S. Cl. ............................. 384/539; 384/585
[58] Field of Search .......................... 384/539, 535, 384/585, 571

[56]  References Cited

U.S. PATENT DOCUMENTS 4,783,182  11/1988  Caron et al. .
5,096,310  3/1992  Meining et al. .

FOREIGN PATENT DOCUMENTS 24 43 918  9/1982  Germany .
37 08 600  3/1990  Germany .

*Primary Examiner*—Lenard A. Footland
*Attorney, Agent, or Firm*—Lerner, David, Littenberg, Krumholz & Mentlik

[57]  ABSTRACT

A connecting ring for holding together first and second inner race sections of adjacent bearings is disclosed. The ring is continuous and made of a resilient material, and includes a plurality of first and second axially opposed resilient tongues which engage with the inner race sections of the bearings.

15 Claims, 2 Drawing Sheets

CONNECTING RING

FIELD OF THE INVENTION

The present invention relates to a connecting ring for holding together inner race sections of adjacent bearings.

BACKGROUND OF THE INVENTION

Particularly in applications where a combination of radial and axial loads have to be accommodated, it is common to provide a bearing assembly in which two adjacent bearings of the ball, roller or taper type are arranged side by side. So that the bearings are always in the correct position relative to each other and to facilitate the assembly of the bearings in the housing, the inner races of the adjacent bearings can be held together by a connecting ring.

As described in, for example, U.S. Pat. Nos. 1,908,474 and 1,379,945, known connecting rings are predominantly U-shaped, with the bores of the inner races of the bearings being provided with corresponding grooves and a channel to accommodate the ring. The connecting ring is commonly made of a spring material and is cut to form an open ring in order that it may be snapped into the grooves and channel in the inner races. In one embodiment described in U.S. Pat. No. 1,379,945, however, the ring is solid and designed to be made of a malleable metal which may be run or hammered into the grooves and channel of the bearings.

While this latter type of connecting ring is much more difficult to apply, it does offer the advantage over the open ring that, once in place, it can only be removed by destroying the ring. This is particularly beneficial when the housing in which the bearing assembly is located is often removed from the shaft on which the bearings run to allow inspection and maintenance work to be carried out on components attached to, or incorporated in, the housing, and the removal of the bearing assembly from the housing is unnecessary. Such is the case, for example, with a wheel hub assembly of a commercial vehicle. By providing a connecting ring which is difficult to remove dissuades the mechanic from removing the bearings, something which could otherwise lead to the ingress of dirt between the inner and outer races.

A connecting ring must be sufficiently strong to endure the loads which arise during assembly and use. For example, when used in the wheel hub assembly of a commercial vehicle, the connecting ring must be able to accommodate the forces generated during assembly of the hub, brake drum and up to two wheels. A connecting ring capable of withstanding relatively high loads is disclosed in German Patent No. 35 37 985. In contrast to the rings described above, the ring in said German document is located radially externally on the inner races of the bearings. This is because the strength of the ring is imparted by using an injection molded ring of considerable wall thickness, which implies that the bores of the inner races simply could not be machined by a sufficient amount to accommodate the bulk of the ring. Although the connection ring disclosed in German Patent No. 35 37 985 is provided with snap-in elements to aid the assembly of the bearings, the location of the ring between the inner and outer races hinders access to the ring when it becomes necessary to remove the bearings from the housing.

SUMMARY OF THE INVENTION

It is therefore an object of the invention to provide a high-strength connection ring which allows for simple assembly of the bearings, which is difficult to remove once in place, but which is accessible for removal should removal be deemed necessary.

This object is achieved in accordance with the present invention by the discovery of a connection ring for holding together first and second inner race sections of adjacent bearings, the connecting ring being continuous and made of a resilient material, and including a plurality of first engagement members for engagement with the first inner race and a plurality of second engagement members for engagement with the second inner race, the first and second engagement members comprising first and second axially opposed resilient tongue members.

In accordance with one embodiment of connecting ring of the present invention each of the pluralities of first and second engagement rings are arranged in circumferential rows around the connecting ring.

In accordance with another embodiment of connecting ring of the present invention, each of the resilient tongue members includes a free end, whereby the free ends of the first tongue members face the free ends of the corresponding second tongue members opposed thereto. In a preferred embodiment, the first tongue members are offset with respect to the second tongue members so as to alternate around the connecting means. In a highly preferred embodiment, the connecting ring comprises steel, preferably stainless steel.

In accordance with a another embodiment of connecting ring of the present invention, the resilient tongue members are formed by stamping substantially H-shaped holes around the connecting ring. In a preferred embodiment, the connecting ring comprises steel, and most preferably stainless steel.

In accordance with another preferred embodiment of the connecting ring of the present invention, the resilient tongue members are formed by stamping substantially U-shaped holes around the connecting ring.

In accordance with another embodiment of connecting ring of the present invention, each of the resilient tongue members has a predetermined width measured in the circumferential direction around the connecting ring, and each of said H-shaped holes or substantially U-shaped holes has a maximum extension measured in the circumferential direction, the predetermined width comprising between about 0.5 and 0.8 times the maximum extension. In a preferred embodiment, each of the resilient tongue members has a predetermined length measured in the axial direction of the connecting ring, the predetermined length corresponding to between about 0.4 and 1.0 times the predetermined width. Preferably, the holes include rounded corners adjacent to the tongue members.

In accordance with another embodiment of connecting ring of the present invention, the connecting ring includes an axial extension and a thickness, the axial extension being between about 15 and 35 times the thickness. In a preferred embodiment, the tongue members protrude outwardly from the surface of the connecting ring by a distance corresponding to the thickness of the connecting ring when the connecting ring is in a non-stressed condition.

The connection ring according to the present invention offers high strength, is easily accommodated in the bores of the inner races of the bearings and lends itself to simple manufacture.

BRIEF DESCRIPTION OF THE DRAWINGS

The invention will be described in greater detail, by way of example only, and with reference to the attached drawings in which.

DETAILED DESCRIPTION OF PREFERRED EMBODIMENTS

Figure 1:
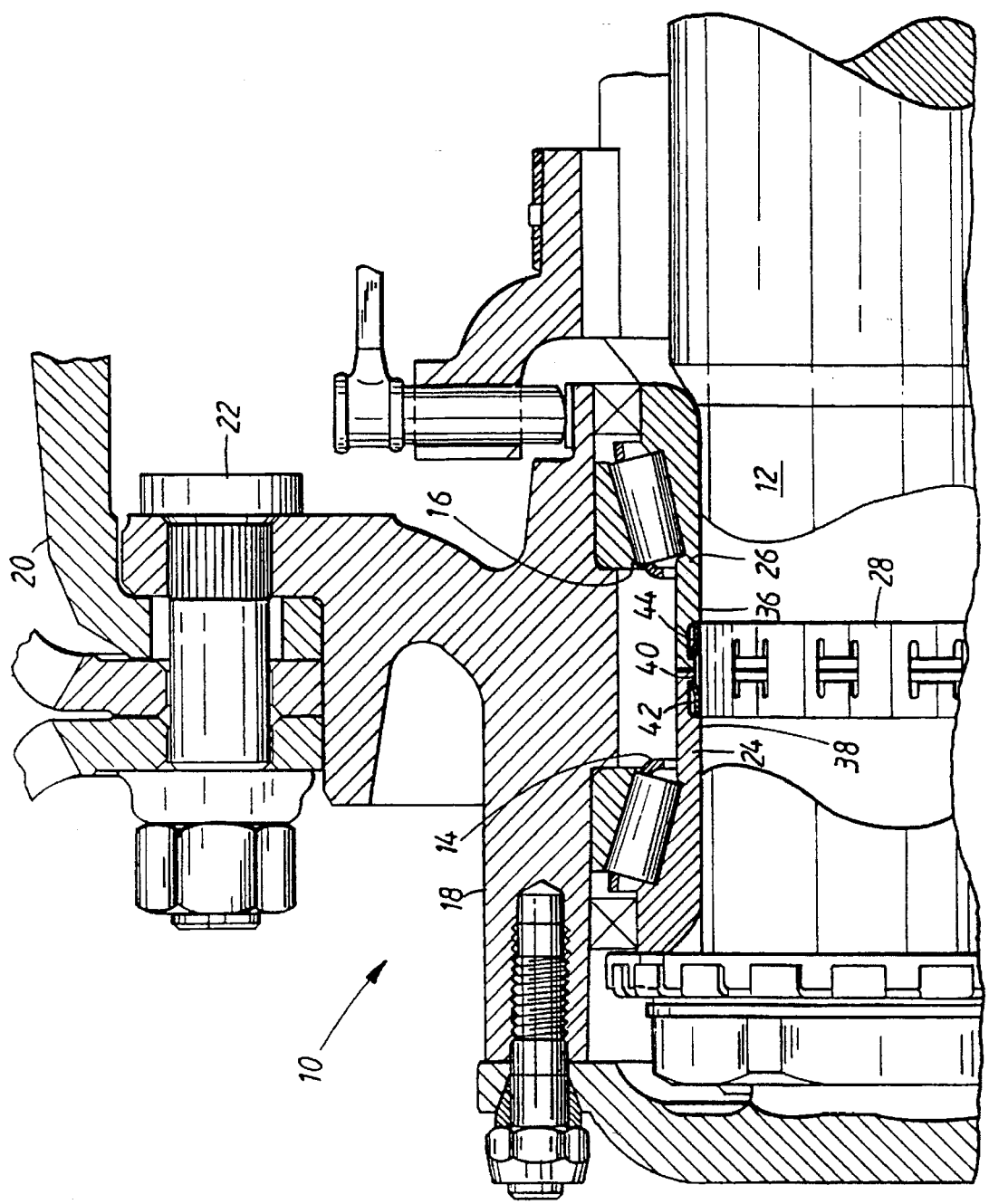
FIG. 1 is a sectional view through a wheel housing assembly of a commercial vehicle with a connection ring according to the present invention in situ.

Referring to the Figures, in which like reference numerals refer to corresponding elements thereof, in FIG. 1, reference numeral 10 generally denotes a wheel hub assembly of a commercial vehicle. The hub assembly is intended to be rotationally carried on a stub axle 12 by means of a pair of taper roller bearings 14, 16, respectively. The bearings 14, 16 are housed in a wheel hub 18 which forms a part of the wheel hub assembly 10. The assembly also includes a brake drum 20 which is affixed to the wheel hub 18 by means of a plurality of bolts 22.

Each of bearings 14, 16 presents an inner race 24, 26, respectively. As shown in FIG. 1, the inner races 24, 26 abut and are located by means of a connecting ring 28. The stub axle 12 in FIG. 1 is interrupted to more clearly illustrate the connecting ring 28.

Figure 2:
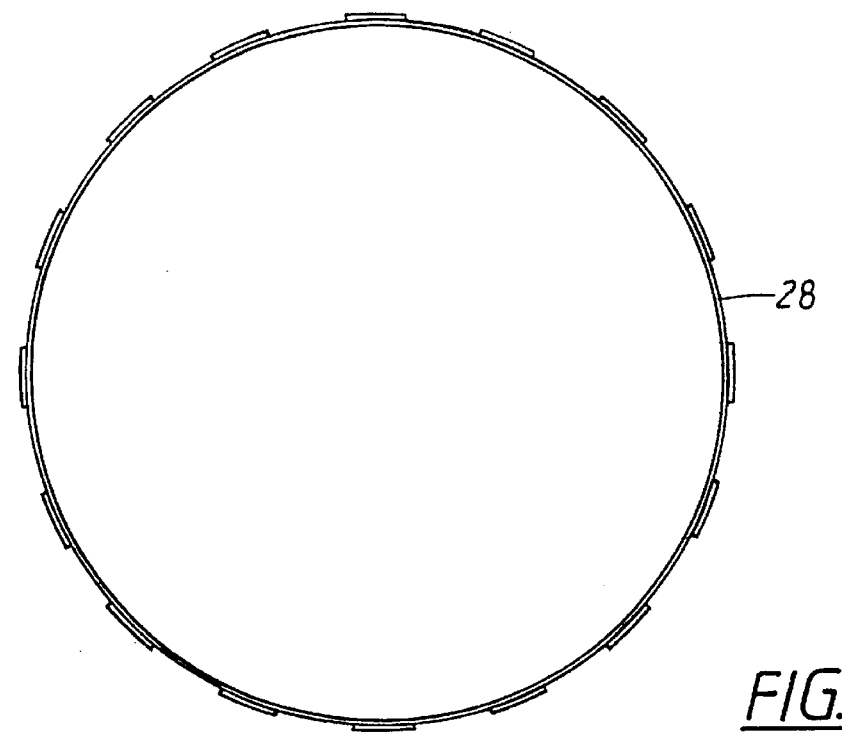
FIG. 2 is an elevational view of one embodiment of a connection ring of the present invention.
Figures 3, 4:
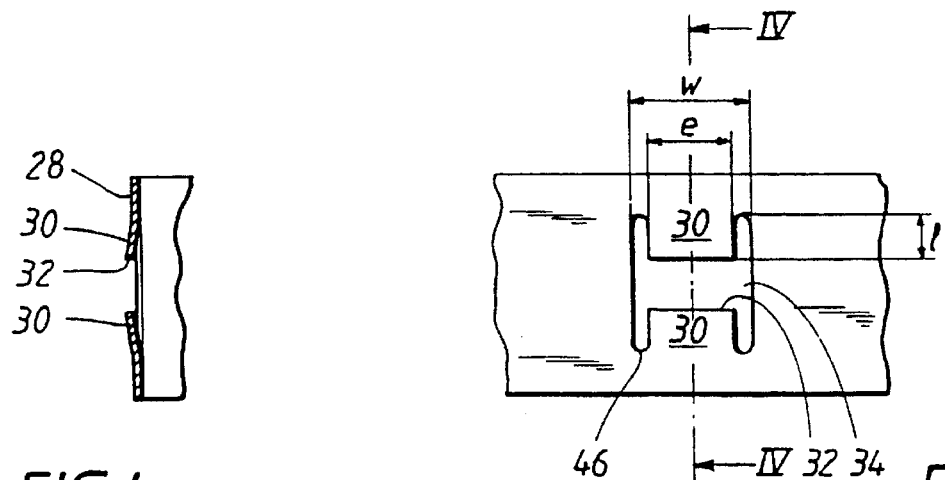
FIG. 3 is a partial plan view of the connection ring shown in FIG. 2.
FIG. 4 is sectional view along line IV—IV of FIG. 3.

The connecting ring 28 is made of a spring material, preferably stainless steel. As is evident from FIGS. 2 to 4, the connecting ring 28 is continuous and is provided with two axially opposed, circumferential rows of outwardly protruding, resilient tongues 30. Preferably, the free ends 32 of the tongues 30 of one row face the free ends 32 of corresponding tongues 30 of the opposed row.

Figure 5:
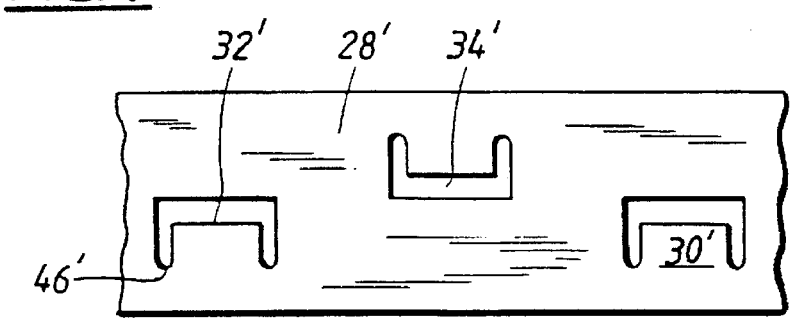
FIG. 5 is a partial plan view of a second embodiment of a connection ring according to the invention.

The tongues 30 are advantageously formed by stamping substantially H-shaped holes 34 (see FIG. 3) in a strip of spring material having a width and thickness corresponding to those of the connecting ring. In the embodiment shown in FIG. 5, corresponding features have been given the same reference numeral, though with the addition of a prime. Thus the tongues 30' in FIG. 5 are formed by stamping substantially U-shaped holes 34' in a strip of spring material. The stampings are arranged such that the free ends 32' of adjacent tongues 30' face axially towards each other, though with the tongues 30' of one row being circumferentially offset with respect to the tongues of the other row so as to lie between adjacent tongues of the other row. The strip is then welded together at its free ends to form a connecting ring 28, 28' with tongues 30, 30' spaced at regular intervals around the ring 28, 28'. During the stamping operation, the tongues 30, 30' are bent outwardly so that in a non-influenced state after the ring is formed they protrude outwardly by a distance preferably corresponding essentially to the thickness of the ring. In an advantageous embodiment of the invention, between 8 and 24, preferably 16, tongues are provided in each circumferential row.

Preferably, the width w of the tongues in a circumferential direction corresponds to between 0.5 and 0.8 times the maximum extension e of the holes 34, 34' in the circumferential direction. In addition, the length l of the tongues in an axial direction corresponds to between 0.4 and 1.0 times the width of the tongues.

In order to reduce stress concentrations in the ring, it is advantageous if the holes 34, 34' are provided with rounded corners 46, 46' where the tongues 34, 34' extend from the ring 28, 28'.

So that the connecting ring 28, 28' is sufficiently stable to withstand the loads which arise in use, the axial extension of the ring should preferably be between 15 and 35 times the thickness of the ring.

Referring back to FIG. 1, the connecting ring 28 in accordance with the invention is accommodated within the inner race bores 36, 38 of the bearings 14, 16, respectively. To achieve this, the bores 36 and 38 are machined to form a common flat channel 40 and a pair of grooves 42, 44, one groove in each inner race. The channel 40 and grooves 42, 44 are so dimensioned that the tongues 30 of the connecting ring 28 project into the grooves 42, 44, with the free ends 32 of the tongues abutting the thus formed flange portions of the inner races.

Due to the resilient tongues 34, the connecting ring 28 can be easily inserted into the inner race of the one bearing and, once the connecting ring is in its terminal position, the tongues spring outwardly to lock the ring in place. The inner race of the second bearing can then be pushed onto the exposed half of the connecting ring 28 until it too is locked into place by the tongues of the second circumferential row.

Since the resilient tongues allow the connecting ring to be inserted into the bearing races with a "snap-in" effect, the connecting ring can be continuous. This implies that the ring according to the present invention can be considerably stronger for a given size than previous split rings. Removal of the connecting ring is purposefully difficult and can only be achieved using a levering tool. Thus, the connecting ring according to the present invention is not intended to be reused. The fact that this type of ring dissuades the mechanic from unnecessarily removing the ring more than offsets the extra cost of having to use a new ring each time a ring is removed. In any case, the production costs of this type of ring are minimal.

The invention is not restricted to the embodiment described above and shown in the drawings, but may be varied within the scope of the appended claims. For example, although it is preferable that each row of tongues comprises at least eight tongues, it is conceivable that fewer tongues be provided, i.e., at least two in each row. The connecting ring need not be manufactured by welding together the free ends of a strip, but may be made by stamping and shaping a continuous ring.

I claim:

1. A connecting ring for holding together first and second inner race sections of adjacent bearings, said connecting ring being continuous and made of a resilient material, said connecting ring including a plurality of first engagement members for engagement with said first inner race and a plurality of second engagement members for engagement with said second inner race, said first and second engagement members comprising first and second axially opposed radically outwardly extending resilient tongue members.

2. The connecting ring of claim 1 wherein each of said pluralities of first and second engagement rings are arranged in circumferential rows around said connecting ring.

3. The connecting ring of claim 2 wherein said first tongue members are offset with respect to said second tongue members so as to alternate around said connecting means.

4. The connecting ring of claim 3 wherein said resilient tongue members are formed by stamping substantially U-shaped holes around said connecting ring.

5. The connecting ring of claim 3 wherein said connecting ring comprises steel.

6. The connecting ring of claim 5 wherein said connecting ring comprises stainless steel.

7. The connecting ring of claim 1 wherein said resilient tongue members are formed by stamping substantially H-shaped holes around said connecting ring.

8. The connecting ring of claim 7 or 5 wherein each of said resilient tongue members has a predetermined width measured in the circumferential direction around said connecting ring, and wherein each of said H-shaped holes or substantially U-shaped holes has a maximum extension measured in said circumferential direction, said predetermined width comprising between about 0.5 and 0.8 times said maximum extension.

9. The connecting ring of claim 8 wherein each of said resilient tongue members has a predetermined length measured in the axial direction of said connecting ring, said predetermined length corresponding to between about 0.4 and 1.0 times said predetermined width.

10. The connecting ring of claim 9 wherein said holes include rounded corners adjacent to said tongue members.

11. The connecting ring of claim 1 wherein each of said resilient tongue members includes a free end, whereby said free ends of said first tongue members face said free ends of said corresponding second tongue members opposed thereto.

12. The connecting ring of claim 11 wherein said connecting ring comprises steel.

13. The connecting ring of claim 12 wherein said connecting ring comprises stainless steel.

14. The connecting ring of claim 1 wherein said connecting ring includes an axial extension and a thickness, said axial extension being between about 15 and 35 times said thickness.

15. The connecting ring of claim 14 wherein said tongue members protrude outwardly from the surface of said connecting ring by a distance corresponding to said thickness of said connecting ring when said connecting ring is in a non-stressed condition.

* * * * *

UNITED STATES PATENT AND TRADEMARK OFFICE
CERTIFICATE OF CORRECTION

PATENT NO.    : 5,651,617
DATED         : July 29, 1997
INVENTOR(S)   : Danielsson It is certified that error appears in the above-identified patent and that said Letters Patent is hereby corrected as shown below:

Column 4, line 51, change "radically" to --radially--.

Signed and Sealed this

Seventh Day of October, 1997

Attest:

BRUCE LEHMAN

Attesting Officer          Commissioner of Patents and Trademarks